(12) United States Patent
Uehara

(10) Patent No.: US 12,209,654 B2
(45) Date of Patent: Jan. 28, 2025

(54) POWER TRANSMISSION DEVICE

(71) Applicant: JATCO Ltd, Fuji (JP)

(72) Inventor: Hiroki Uehara, Hadano (JP)

(73) Assignee: JATCO LTD, Fuji (JP)

( * ) Notice: Subject to any disclaimer, the term of this patent is extended or adjusted under 35 U.S.C. 154(b) by 0 days.

(21) Appl. No.: 18/573,064

(22) PCT Filed: May 26, 2022

(86) PCT No.: PCT/JP2022/021517
§ 371 (c)(1),
(2) Date: Dec. 21, 2023

(87) PCT Pub. No.: WO2022/270217
PCT Pub. Date: Dec. 29, 2022

(65) Prior Publication Data
US 2024/0288062 A1 Aug. 29, 2024

(30) Foreign Application Priority Data

Jun. 24, 2021 (JP) ................................. 2021-105243

(51) Int. Cl.
*F16H 57/04* (2010.01)
(52) U.S. Cl.
CPC ..... *F16H 57/0483* (2013.01); *F16H 57/0421* (2013.01); *F16H 57/045* (2013.01); *F16H 57/0479* (2013.01)

(58) Field of Classification Search
CPC ............... F16H 57/0424; F16H 57/045; F16H 57/0454; B60K 2001/001; B60K 2001/003; B60K 2001/006
See application file for complete search history.

(56) References Cited

U.S. PATENT DOCUMENTS

| 5,643,127 | A | * | 7/1997 | Yoshii | F16H 57/0483 |
| | | | | | 184/6.12 |
| 7,980,343 | B2 | * | 7/2011 | Mogi | H02K 7/116 |
| | | | | | 184/6.12 |
| 8,348,800 | B2 | * | 1/2013 | Tanaka | B60K 1/00 |
| | | | | | 475/221 |
| 8,459,134 | B2 | * | 6/2013 | Harashima | F16H 57/0441 |
| | | | | | 74/325 |
| 8,727,928 | B2 | * | 5/2014 | Harashima | F16H 37/082 |
| | | | | | 475/221 |
| 10,989,297 | B2 | * | 4/2021 | Guarino | F16H 57/0471 |
| 11,279,218 | B2 | * | 3/2022 | Hibino | F16H 57/0427 |
| 11,413,946 | B2 | | 8/2022 | Absenger et al. | |
| 2004/0163409 | A1 | | 8/2004 | Nakajima et al. | |

(Continued)

FOREIGN PATENT DOCUMENTS

| JP | 2004-260898 A | 9/2004 |
| JP | 2008-185078 A | 8/2008 |

(Continued)

*Primary Examiner* — Derek D Knight
(74) *Attorney, Agent, or Firm* — Foley & Lardner LLP

(57) ABSTRACT

A unit includes a housing configured to accommodate a planetary gear mechanism, wherein the housing includes a flow path through which a coolant flows, the planetary gear mechanism includes a stepped pinion gear, the stepped pinion gear includes a small pinion and a large pinion, and the flow path has a portion that overlaps the large pinion when viewed in a radial direction.

5 Claims, 9 Drawing Sheets

(56) References Cited

U.S. PATENT DOCUMENTS

| | | |
|---|---|---|
| 2008/0182712 A1 | 7/2008 | Kira et al. |
| 2009/0127954 A1* | 5/2009 | Mogi ................. F16H 57/0476 310/90 |
| 2018/0180162 A1* | 6/2018 | Hakuta .................. F16H 57/08 |

FOREIGN PATENT DOCUMENTS

| | | | | |
|---|---|---|---|---|
| JP | 2009-281446 A | | 12/2009 | |
| JP | 2011-174583 A | | 9/2011 | |
| JP | 2011256969 A | * | 12/2011 | ............... B60K 1/00 |
| WO | WO-2020/032026 A1 | | 2/2020 | |
| WO | WO-2020/069744 A1 | | 4/2020 | |

* cited by examiner

POWER TRANSMISSION DEVICE

TECHNICAL FIELD

The present invention relates to a unit.

BACKGROUND ART

Patent Document 1 discloses a unit including a rotating electrical machine and a reduction gear.

PRIOR ART DOCUMENT

Patent Document

Patent Document 1: JP 2008-185078 A

SUMMARY OF INVENTION

It is required to improve heat exchange efficiency in the unit.

According to one aspect of the present invention, a unit includes a housing configured to accommodate a planetary gear mechanism, wherein the housing includes a flow path through which a coolant flows, the planetary gear mechanism includes a stepped pinion gear, the stepped pinion gear includes a small pinion and a large pinion, and the flow path has a portion that overlaps the large pinion when viewed in a radial direction.

According to an embodiment of the present invention, the heat exchange efficiency can be improved.

DESCRIPTION OF EMBODIMENTS

Figure 1:
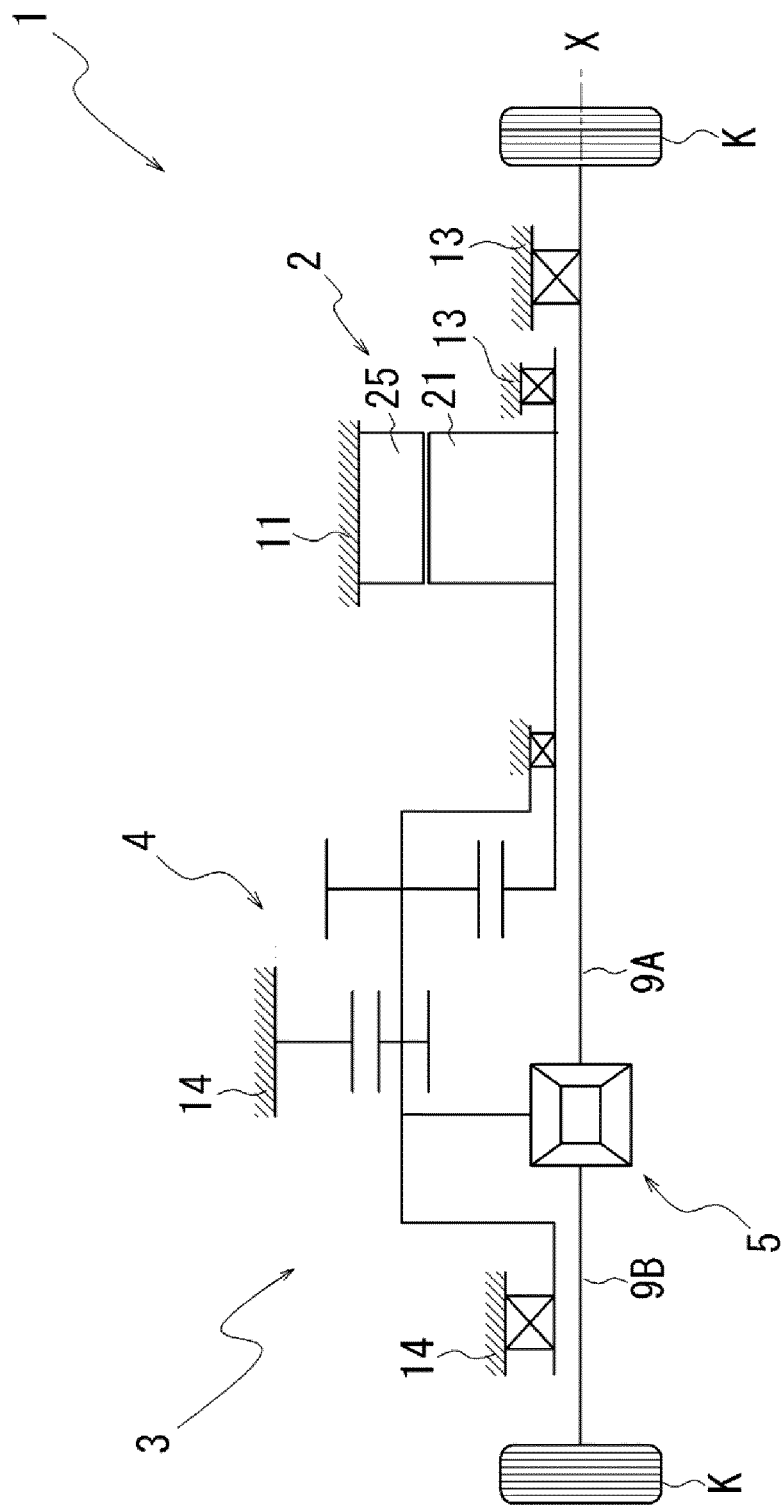
FIG. 1 is a skeleton diagram illustrating a unit mounted on a vehicle.

First, definitions of terms in the present description will be described.

A "unit" is also referred to as a "motor unit", a "power transmission device", or the like. The motor unit is a unit that includes at least a motor. The power transmission device is a device that includes at least a power transmission mechanism, and the power transmission mechanism is, for example, a gear mechanism and/or a differential gear mechanism. A unit that is a device including a motor and a power transmission mechanism belongs to concepts of both the motor unit and the power transmission device.

A "housing" accommodates a motor, a gear, and an inverter. The housing includes one or more cases.

"3-in-1" means a form in which a part of a motor case accommodating a motor and a part of an inverter case accommodating an inverter are integrally formed. For example, when a cover and a case constitute one case, in "3-in-1", the case accommodating a motor and the case accommodating an inverter are integrally formed.

A "motor" is a rotating electrical machine that has a motor function and/or a generator function.

When referring to a second element (component, portion, or the like) connected to a first element (component, portion, or the like), the second element (component, portion, or the like) connected downstream of the first element (component, portion, or the like), and the second element (component, portion, or the like) connected upstream of the first element (component, portion, or the like), it means that the first element and the second element are connected such that power can be transmitted. A power input side is upstream, and a power output side is downstream. The first element and the second element may be connected to each other via another element (clutch, other gear mechanism, or the like).

The description "overlap when viewed in a predetermined direction" means that a plurality of elements are disposed in a predetermined direction, and has the same meaning as the description "overlap in a predetermined direction". The "predetermined direction" is, for example, an axial direction, a radial direction, a gravity direction, or a vehicle traveling direction (vehicle forward direction, vehicle backward direction).

When the drawing illustrates that a plurality of elements (components, portions, or the like) are disposed in a predetermined direction, in the description of the present description, it may be considered that there is a sentence explaining that the plurality of elements overlap when viewed in the predetermined direction.

The descriptions "do not overlap when viewed in a predetermined direction" and "offset when viewed in a predetermined direction" mean that a plurality of elements are not disposed in a predetermined direction, and have the same meaning as the descriptions "do not overlap in a predetermined direction" and "offset in a predetermined direction". The "predetermined direction" is, for example, an axial direction, a radial direction, a gravity direction, or a vehicle traveling direction (vehicle forward direction, vehicle backward direction).

When the drawing illustrates that a plurality of elements (components, portions, or the like) are not disposed in a predetermined direction, in the description of the present description, it may be considered that there is a sentence explaining that the plurality of elements do not overlap when viewed in the predetermined direction.

The description "a first element (component, portion, or the like) is positioned between a second element (component, portion, or the like) and a third element (component, portion, or the like) when viewed in a predetermined direction" means that when viewed from the predetermined direction, it can be observed that the first element is between the second element and the third element. The "predetermined direction" is an axial direction, a radial direction, a gravity direction, a vehicle traveling direction (vehicle forward direction, vehicle backward direction), or the like.

For example, when the second element, the first element, and the third element are disposed in this order along the axial direction, it can be said that the first element is positioned between the second element and the third element when viewed in the radial direction. When the drawing illustrates that the first element is positioned between the second element and the third element when viewed in a predetermined direction, in the description of the present description, it may be considered that there is a sentence explaining that the first element is between the second element and the third element when viewed in the predetermined direction.

In a case in which two elements (components, portions, or the like) overlap when viewed in the axial direction, the two elements are coaxial.

The "axial direction" means an axial direction of a rotation axis of a component that constitutes a unit. The "radial direction" means a direction orthogonal to the rotation axis of the component that constitutes a unit. The component is, for example, a motor, a gear mechanism, or a differential gear mechanism.

When a rotating element (for example, sun gear, carrier, or ring gear) of a planetary gear mechanism is "fixed" to another element, the rotating element may be directly fixed or may be fixed via another member.

A "downstream side in a rotation direction" means a downstream side in a rotation direction when a vehicle moves forward or in a rotation direction when the vehicle moves backward. It is preferable to regard it as the downstream side in the rotation direction when the vehicle moves forward, which occurs frequently. A downstream side in a rotation direction of the planetary gear mechanism means a downstream side in a revolution direction of a pinion gear.

A "catch tank" is an element (component, portion, or the like) that has a function of a tank (container) into which oil is introduced. The supply of oil from the outside of the tank to the tank is expressed as "catch". The catch tank is provided, for example, using at least a part of the housing, or is provided separately from the housing. Integrally forming the catch tank and the housing contributes to a reduction in the number of components.

The "coolant" is a refrigerant, and is, for example, a liquid (cooling water or the like) or a gas (air or the like). The coolant is a concept that includes oil, but when both the oil and the coolant are described in the present description, it means that the coolant is made of a material different from that of the oil.

A "heat exchange unit" is an element (component, portion, or the like) that exchanges heat between two different heat exchange media. Combinations of the two heat exchange media are, for example, oil and cooling water, cooling water and air, or air and oil.

In an aspect of the present invention, it is preferable to use, for example, a flow path, through which the coolant flows, formed in the housing as the heat exchange unit. This is because the flow path can contribute to a reduction in dimension of the unit.

The "flow path, through which the coolant flows, formed in the housing" is a portion integrally formed with the housing. For example, heat exchange between the coolant and the oil and/or air in the housing is performed via a wall portion of the housing.

A "vehicle room" means a room in a vehicle into which occupants enter.

Hereinafter, the present embodiment will be described.

FIG. 1 is a skeleton diagram illustrating a unit mounted on a vehicle.

Figure 2:
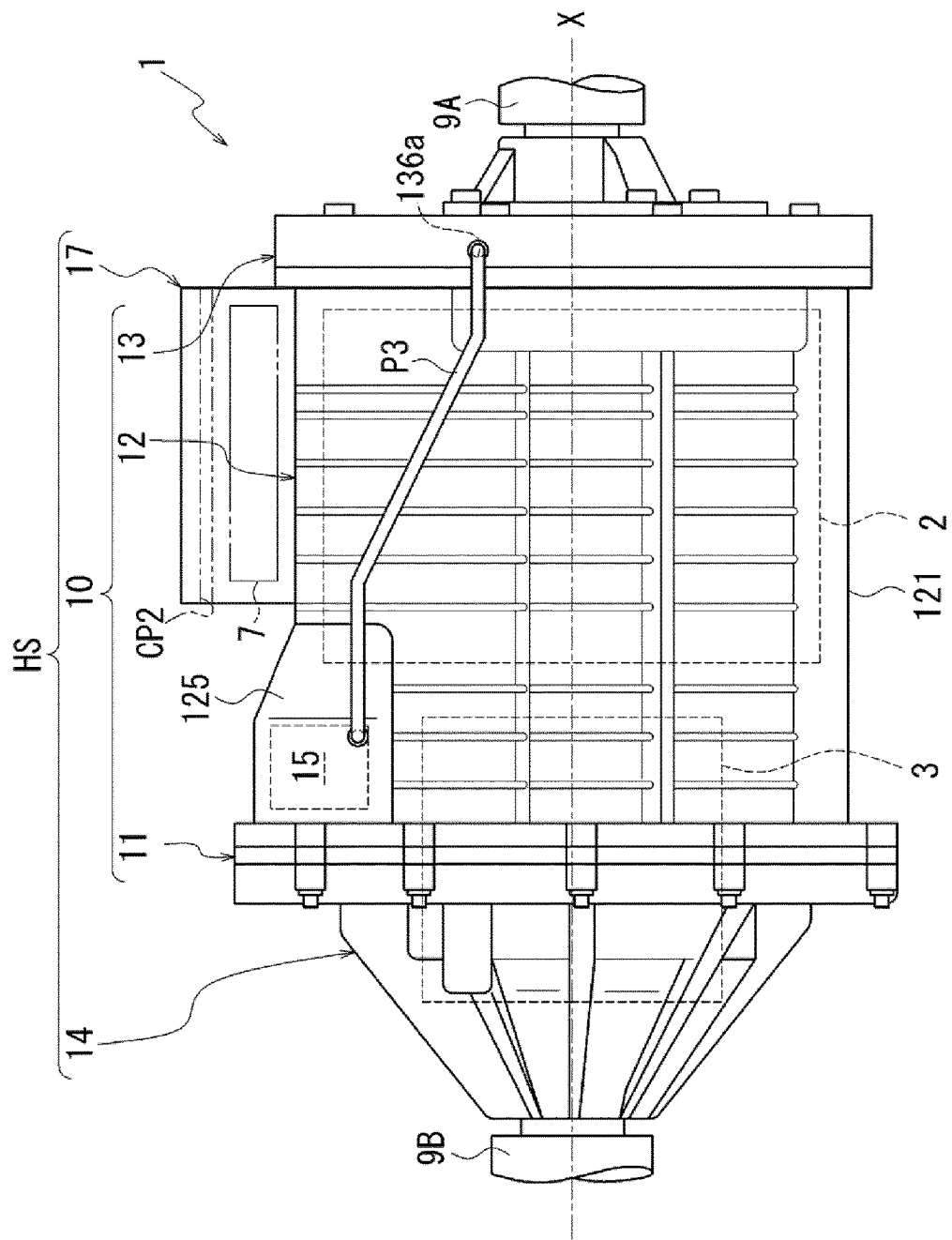
FIG. 2 is an external view of the unit.

FIG. 2 is an external view of the unit.

Figure 3:
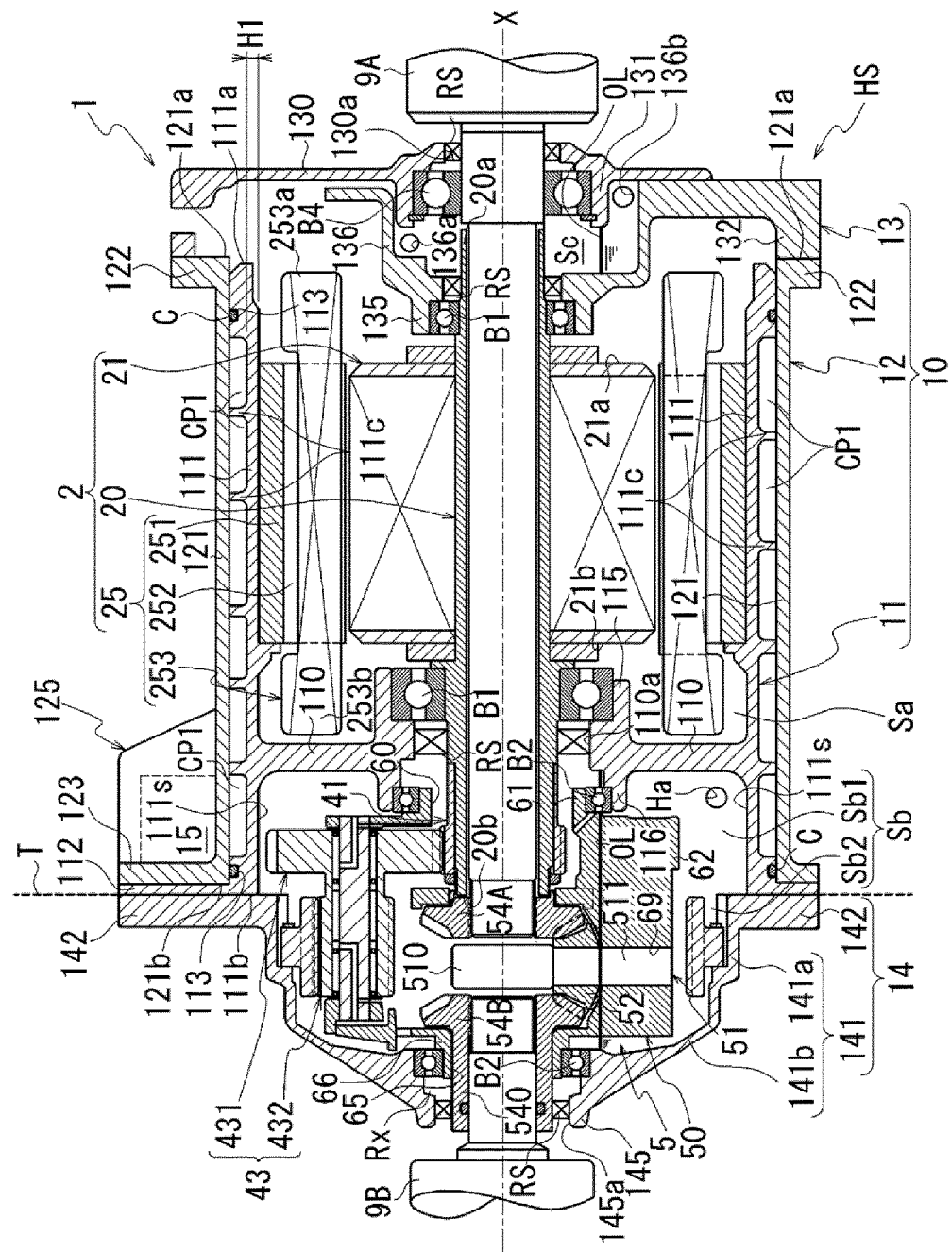
FIG. 3 is a schematic cross-sectional view of the unit.

FIG. 3 is a schematic cross-sectional diagram of the unit. FIG. 3 illustrates a state in which an inverter case is removed.

Figure 4:
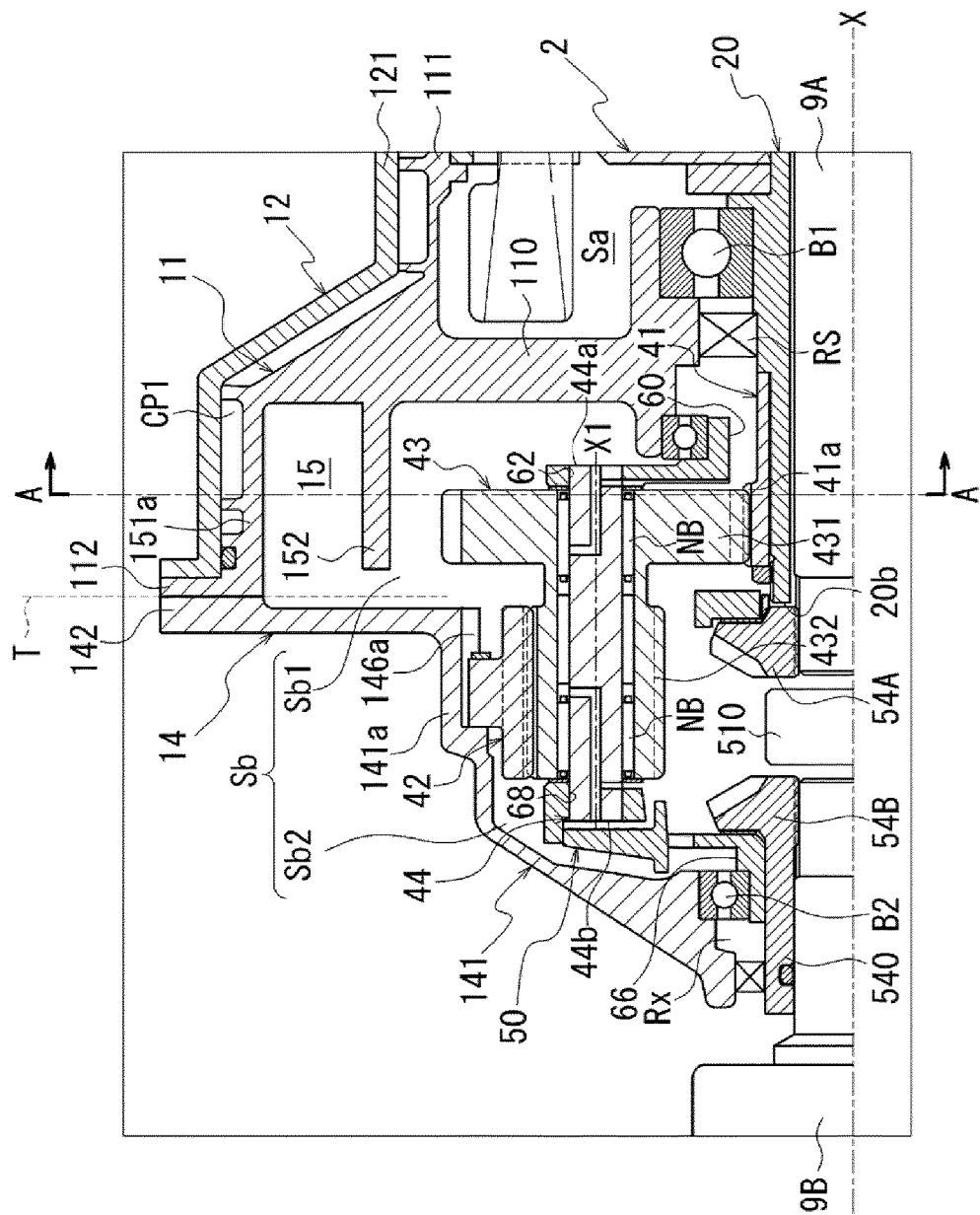
FIG. 4 is an enlarged view around a planetary reduction gear.

FIG. 4 is an enlarged view around a planetary reduction gear.

Figure 5:
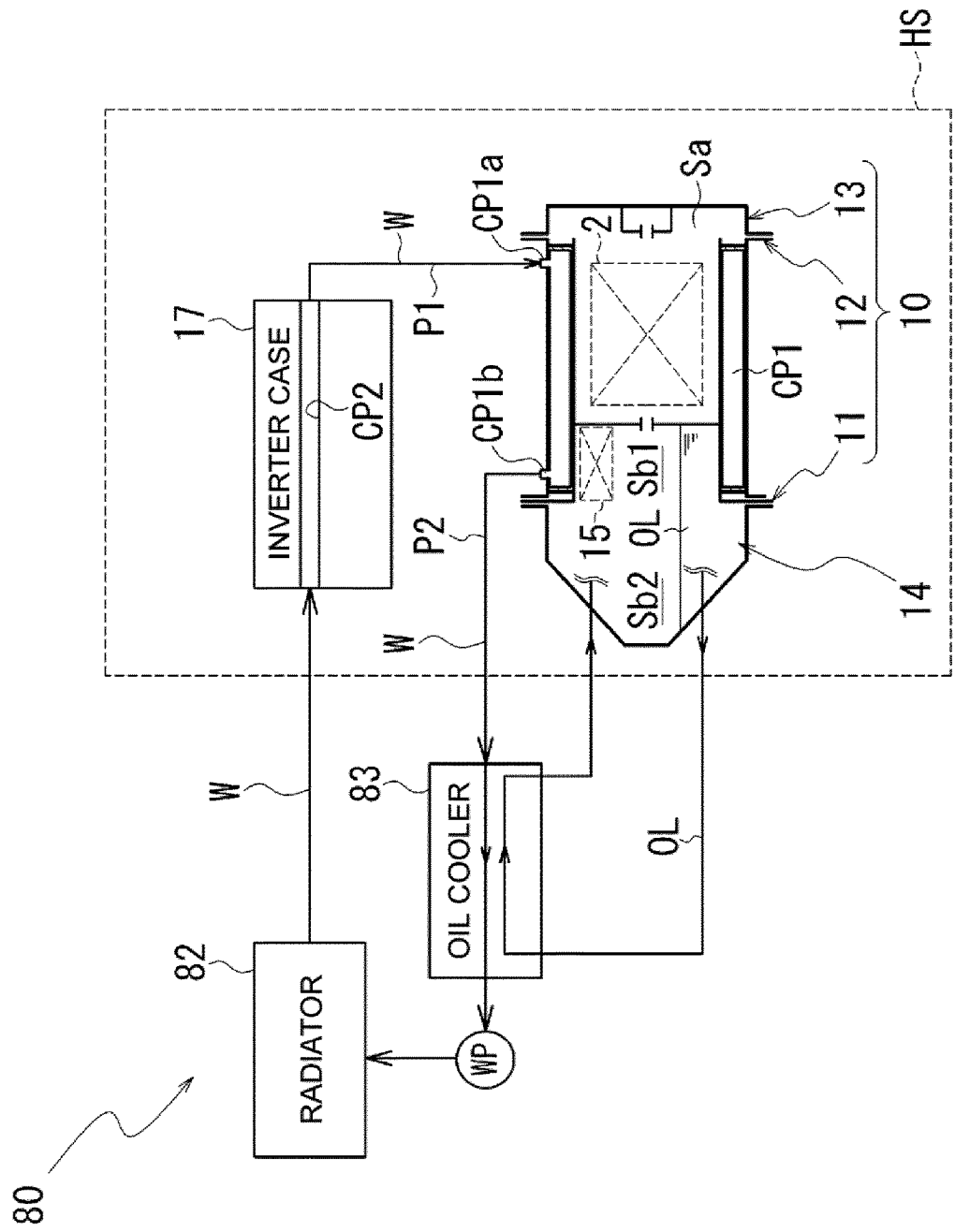
FIG. 5 is a diagram illustrating a circulation system of cooling water in the unit.

FIG. 5 is a diagram illustrating a circulation system of cooling water in the unit.

Figure 6:
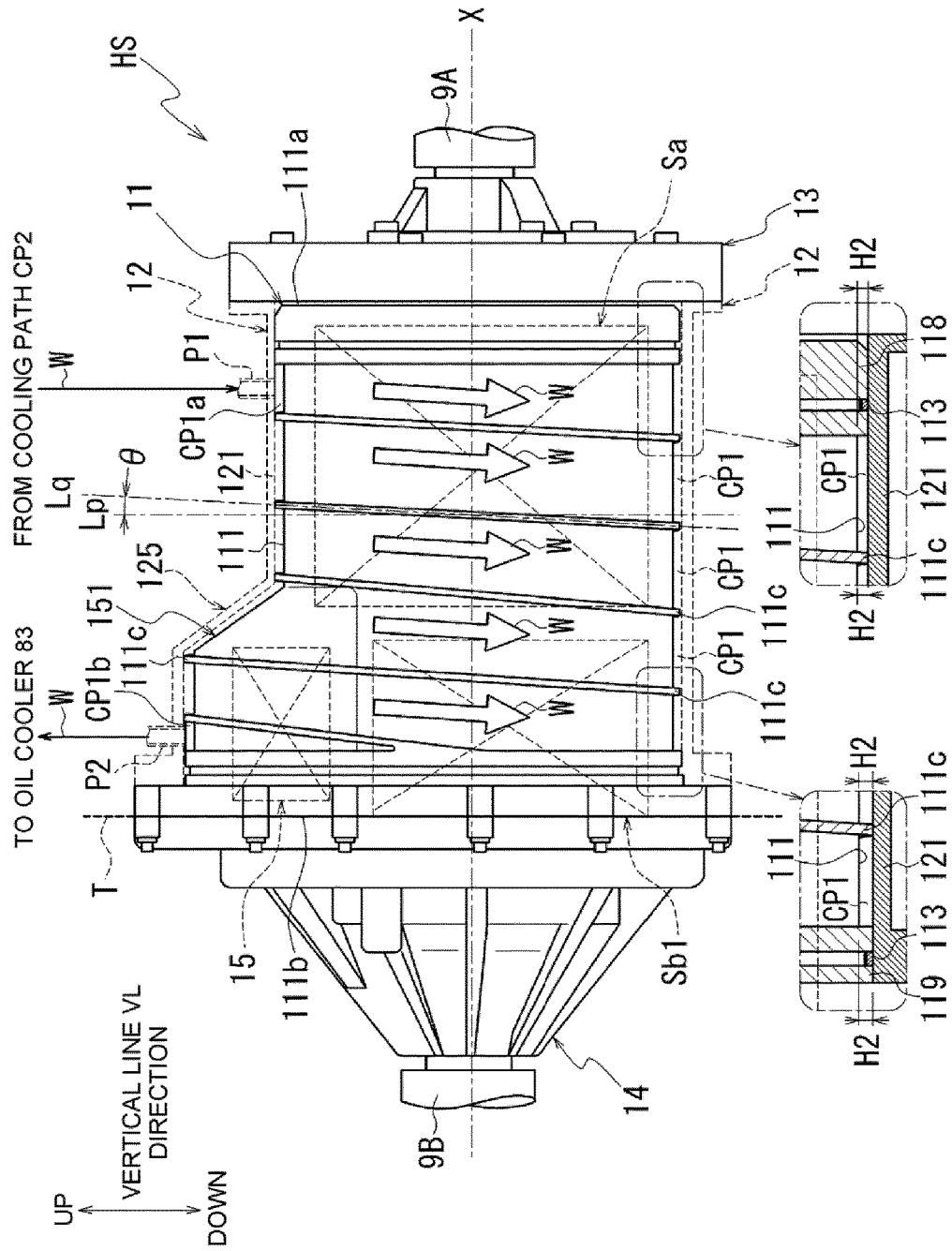
FIG. 6 is a diagram illustrating a cooling path.

FIG. 6 is a diagram illustrating a cooling path. FIG. 6 illustrates the unit when viewed from the same direction as FIG. 2. In FIG. 6, the second case member is indicated by a broken line, and the inverter case is omitted. In enlarged views in FIG. 6, regions of a protrusion 111c and thick portions 118 and 119 are illustrated with hatching.

Figure 7:
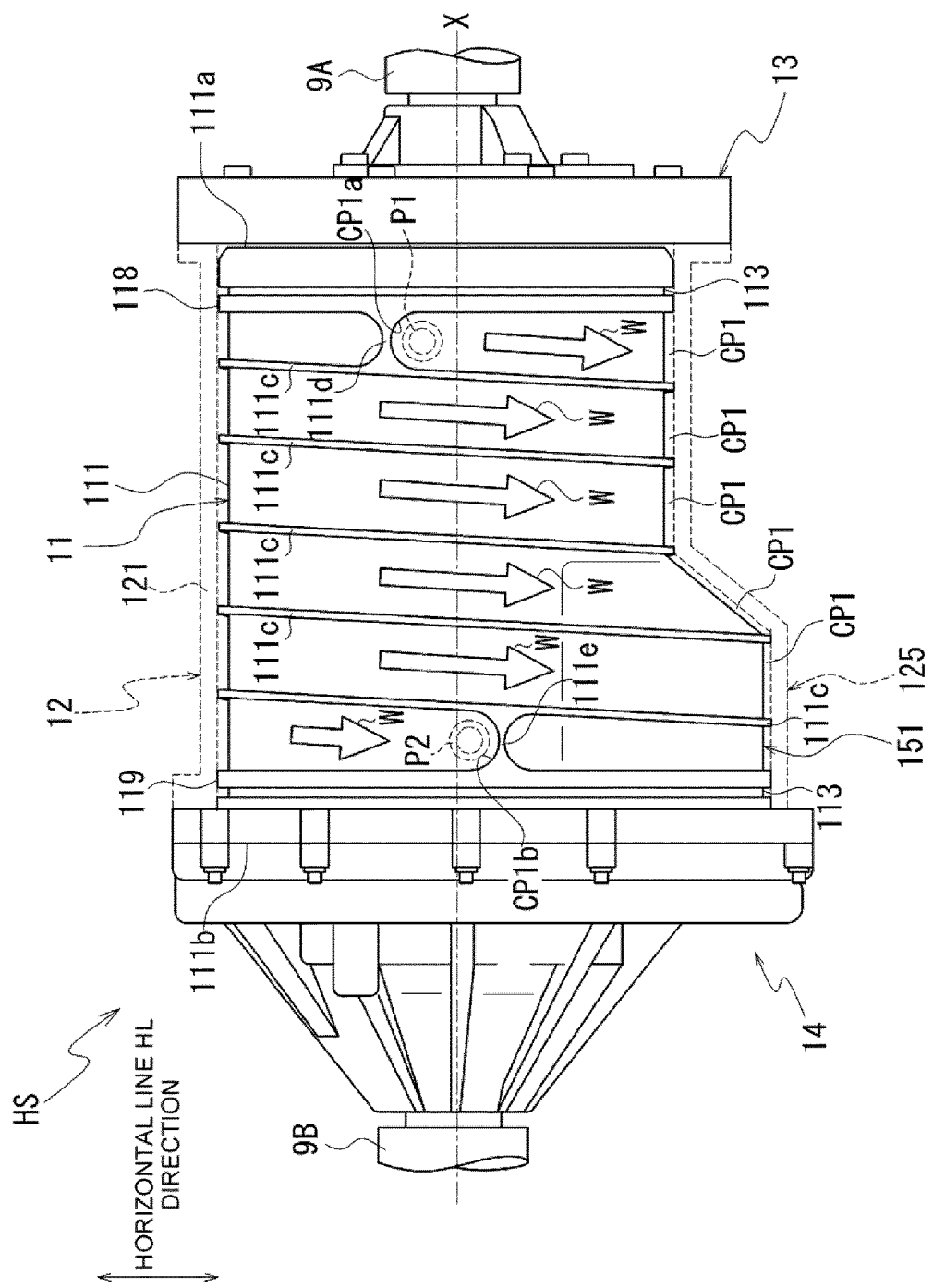
FIG. 7 is a diagram illustrating the cooling path.

FIG. 7 is a diagram illustrating the cooling path. FIG. 7 illustrates the unit in FIG. 2 when viewed from above. In FIG. 7, the second case member is indicated by a broken line.

Figure 8:
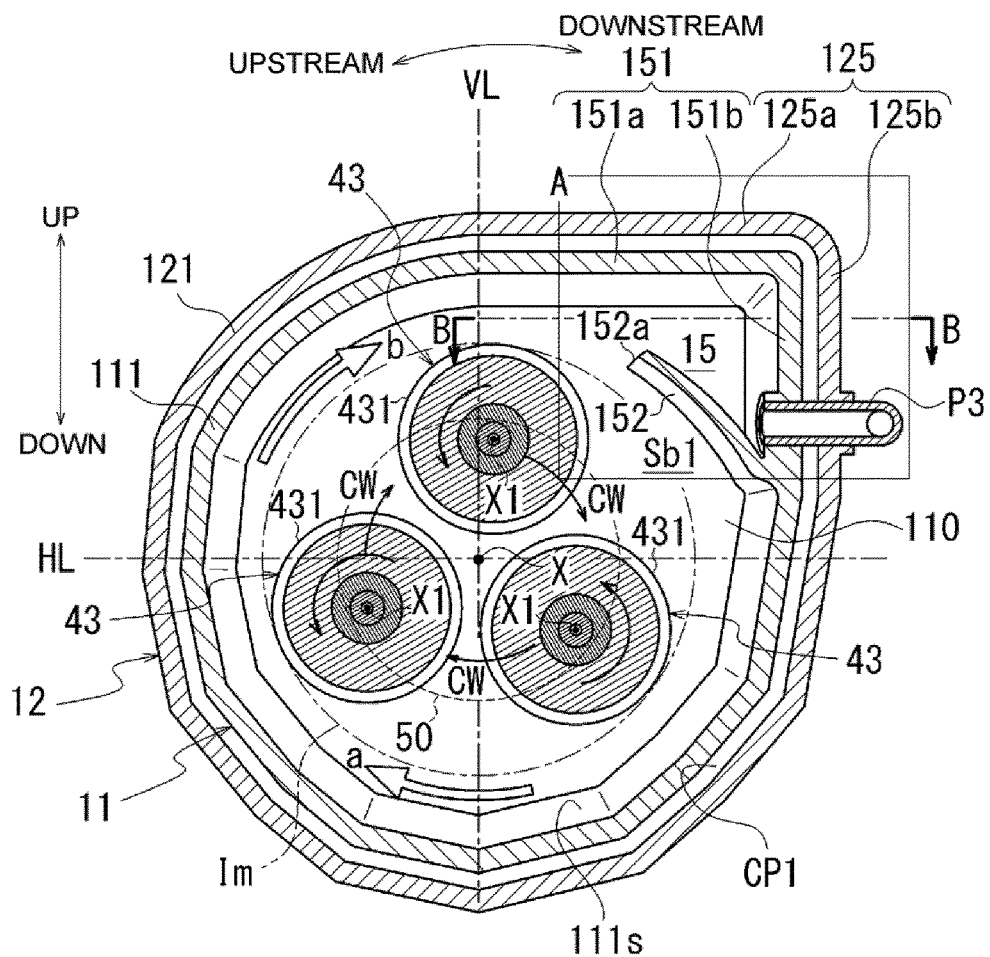
FIG. 8 is a diagram illustrating oil scraping up by rotation of a planetary gear mechanism.

FIG. 8 is a diagram illustrating oil scraping up by rotation of the planetary gear mechanism. FIG. 8 is a schematic cross-sectional diagram taken along line A-A in FIG. 4.

Figure 9:
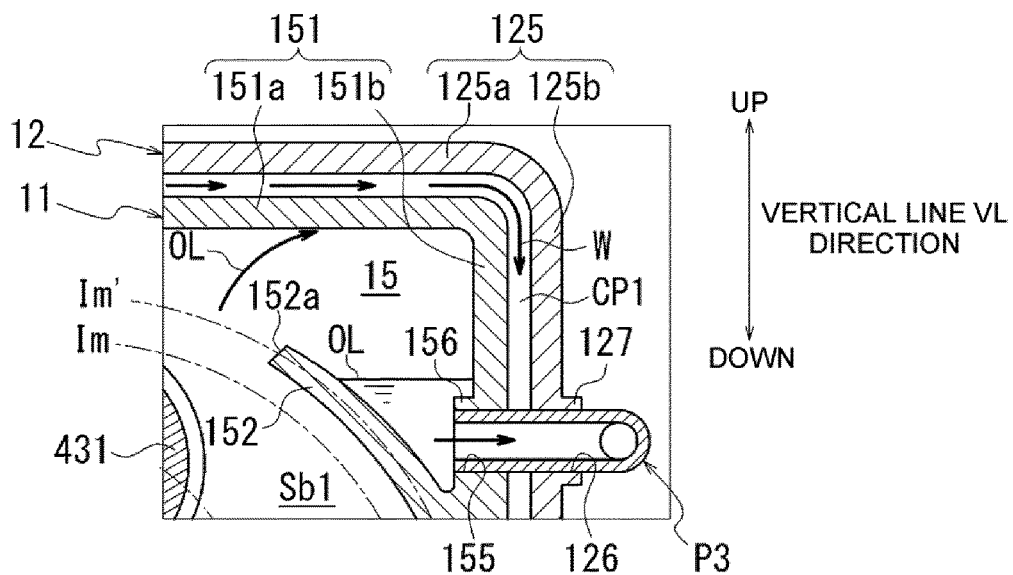
FIG. 9 is a diagram illustrating a catch tank.

FIG. 9 is a diagram illustrating a catch tank. FIG. 9 is an enlarged view of a region A in FIG. 8.

Figure 10:
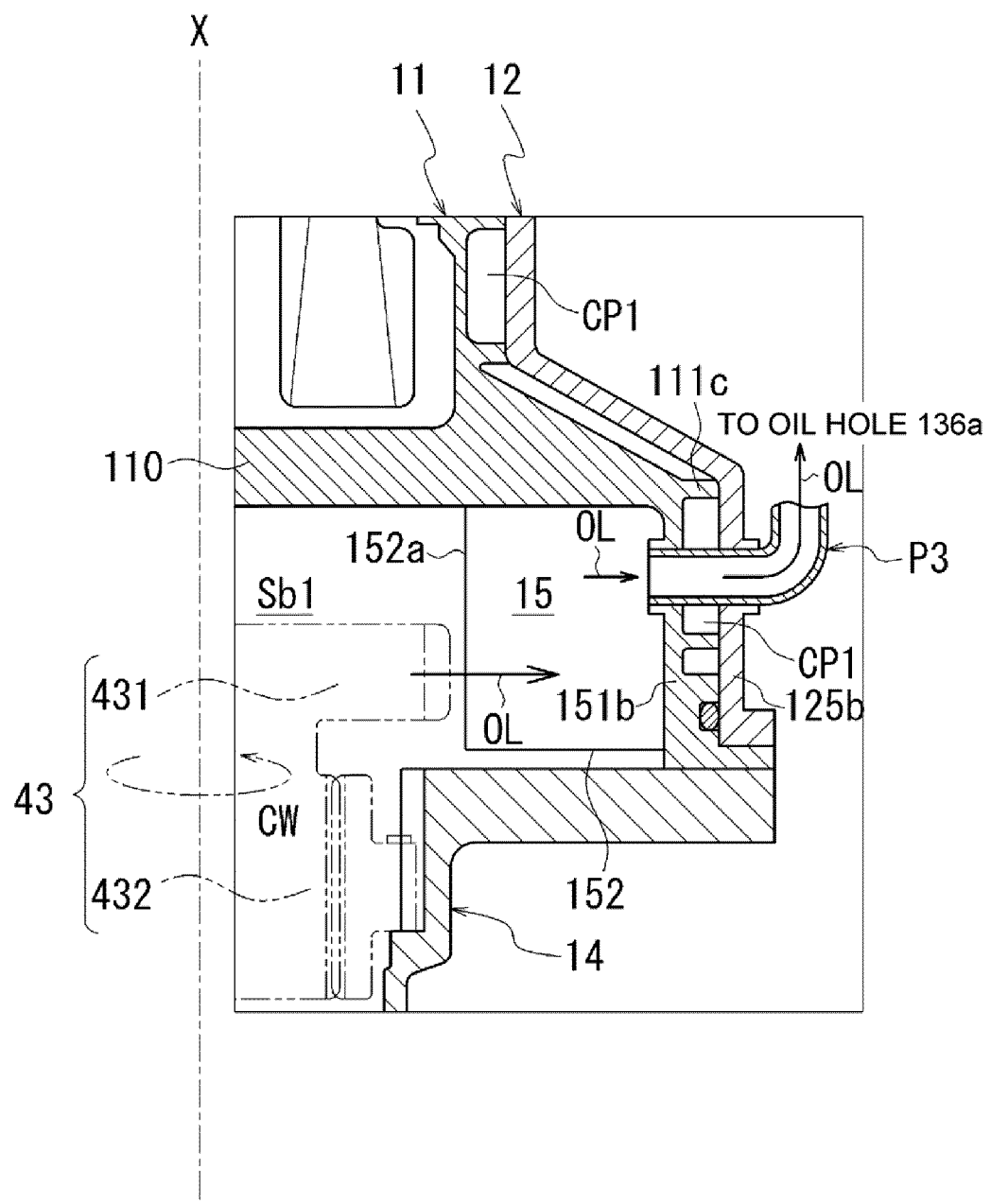
FIG. 10 is a diagram illustrating the catch tank.

FIG. 10 is a diagram illustrating the catch tank. FIG. 10 is a schematic cross-sectional diagram taken along line B-B in FIG. 8. In FIG. 10, a pipe P3 is also illustrated in cross section.

As illustrated in FIG. 1, the unit 1 includes a motor 2, a power transmission mechanism 3 that transmits power output from the motor 2 to drive wheels K, K of a vehicle, and an inverter 7 (see FIG. 2) that is a power conversion device of the motor 2.

A housing HS of the unit 1 is a "3-in-1" unit in which a part of a motor case 10 that accommodates the motor 2 and an inverter case 17 that accommodates the inverter 7 are integrally formed.

In the present embodiment, as illustrated in FIG. 1, the unit 1 includes, as the power transmission mechanism 3, a planetary reduction gear 4 (reduction gear mechanism, planetary gear mechanism), a differential mechanism 5 (differential gear mechanism), and drive shafts 9 (9A and 9B) as output shafts.

In the unit 1, the planetary reduction gear 4, the differential mechanism 5, and the drive shafts 9 (9A and 9B) are provided along a transmission path of output rotation around a rotation axis X of the motor 2. Axes of the drive shafts 9 (9A and 9B) are coaxial with the rotation axis X of the motor 2, and the differential mechanism 5 is coaxial with the motor 2.

In the unit 1, the output rotation of the motor 2 is decelerated by the planetary reduction gear 4 and input to the differential mechanism 5, and then transmitted to the left and right drive wheels K, K of the vehicle equipped with the unit 1 via the drive shafts 9 (9A and 9B).

Here, the planetary reduction gear 4 is connected downstream of the motor 2. The differential mechanism 5 is connected downstream of the motor 2 via the planetary reduction gear 4. The drive shafts 9 (9A and 9B) are connected downstream of the differential mechanism 5.

As illustrated in FIG. 2, the housing HS of the unit 1 is a 3-in-1 type housing, and accommodates the motor 2, the power transmission mechanism 3, and the inverter 7. The housing HS includes one or more cases. The housing HS includes, for example, the motor case 10 that accommodates the motor 2, a gear case 14 that accommodates the power transmission mechanism 3, and the inverter case 17 that accommodates the inverter 7. The gear case 14 is joined to one end of the motor case 10 in a rotation axis X direction. The inverter case 17 is joined above the motor case 10 in a vertical line VL direction in a state in which the unit 1 is mounted on the vehicle at a position avoiding a catch tank 15, which will be described later.

The inverter 7 is an electronic component including a smoothing capacitor, a power semi-conductor element, a driver board, and the like. The inverter 7 is electrically connected to the motor 2 inside the motor case 10 by wiring (not illustrated).

The motor 2 has a portion that overlaps the differential mechanism 5 (differential gear mechanism) when viewed in an axial direction (see FIG. 3). Here, "when viewed in an axial direction" means when viewed from the rotation axis X direction.

When viewed in the axial direction, the motor 2 has a portion that overlaps the planetary reduction gear 4 (reduction gear mechanism).

When viewed in the axial direction, the planetary reduction gear 4 (reduction gear mechanism) has a portion that overlaps the differential mechanism 5 (differential gear mechanism).

When viewed in the axial direction, the planetary reduction gear 4 (reduction gear mechanism) has a portion that overlaps the motor 2.

When viewed in the axial direction, the differential mechanism 5 (differential gear mechanism) has a portion that overlaps the planetary reduction gear 4 (reduction gear mechanism).

When viewed in the axial direction, the differential mechanism 5 (differential gear mechanism) has a portion that overlaps the motor 2.

When viewed in the axial direction, the motor 2 has a portion that overlaps the differential mechanism 5 (differential gear mechanism).

As illustrated in FIG. 3, the motor case 10 includes a first case member 11, a second case member 12 fitted onto the first case member 11, and a cover member 13 joined to one end of the second case member 12. The first case member 11 includes a support wall portion 111 that surrounds the rotation axis X with a gap therebetween, and a flange-shaped joint portion 112 provided at the other end 111b of the support wall portion 111.

The support wall portion 111 is provided in a direction along the rotation axis X of the motor 2. The motor 2 and a part of the power transmission mechanism 3, which will be described later, are accommodated inside the support wall portion 111.

The second case member 12 includes a peripheral wall portion 121 that surrounds the rotation axis X with a gap therebetween, a flange-shaped joint portion 122 provided at one end 121a of the peripheral wall portion 121, and a flange-shaped joint portion 123 provided at the other end 121b of the peripheral wall portion 121.

The peripheral wall portion 121 of the second case member 12 is formed with an inner diameter that allows the peripheral wall portion 121 to be fitted onto the support wall portion 111 of the first case member 11.

The first case member 11 and the second case member 12 are assembled by fitting the peripheral wall portion 121 of the second case member 12 onto the support wall portion 111 of the first case member 11.

The joint portion 123 at the other end 121b of the peripheral wall portion 121 comes into contact with the joint portion 112 of the first case member 11 from the rotation axis X direction. The joint portions 123 and 112 are connected to each other by bolts (not illustrated).

A wall portion 110 (cover) extending radially inward is provided in a region between the one end 111a and the other end 111b of the support wall portion 111. The wall portion 110 is provided in a direction orthogonal to the rotation axis X. An opening 110a through which the drive shaft 9A is inserted is opened in a region of the wall portion 110 that intersects the rotation axis X.

A motor support portion 115 extending toward the motor 2 is provided on a surface of the wall portion 110 closer to the motor 2 (right side in the drawing). The motor support portion 115 has a tubular shape surrounding the opening 110a.

The motor support portion 115 is inserted into a coil end 253b, which will be described later. The motor support portion 115 faces an end portion 21b of a rotor core 21 with a gap therebetween in the rotation axis X direction. A bearing B1 is supported on an inner periphery of the motor support portion 115. The outer periphery of the motor shaft 20 is supported by the motor support portion 115 via the bearing B1.

A tubular wall portion 116 is provided on a surface of the wall portion 110 closer to the differential mechanism 5 (left side in the drawing). The tubular wall portion 116 has a tubular shape surrounding the opening 110a. The tubular wall portion 116 extends toward the differential mechanism 5 along the rotation axis X. A bearing B2 is supported on an inner periphery of the tubular wall portion 116. The bearing B2 supports an outer periphery of a tubular wall portion 61 of a differential case 50, which will be described later.

Here, the thick portions 118 and 119 are provided at the one end 111a and the other end 111b of the support wall portion 111 (see FIG. 6). The thick portions 118 and 119 protrude radially outward from an outer periphery of the support wall portion 111. A radial thickness H2 of the thick portions 118 and 119 is larger than a radial thickness H1 of the support wall portion 111.

The thick portions 118 and 119 are provided over entire circumference of the support wall portion 111 in a circumferential direction around the rotation axis X. Seal grooves 113 and 113 are each opened in outer periphery surfaces of the thick portions 118 and 119. The seal grooves 113 and 113 are provided along the circumferential direction around the rotation axis X, and are each provided over entire circumferences of the thick portions 118 and 119 in the circumferential direction around the rotation axis X.

As illustrated in FIG. 3, seal members C and C are fitted and attached to the seal grooves 113 and 113. The seal members C and C are pressed against an inner periphery of the peripheral wall portion 121 fitted onto the support wall portion 111 to seal gaps between the outer periphery of the support wall portion 111 and the inner periphery of the peripheral wall portion 121.

As illustrated in FIG. 6, the protrusion 111c is provided on the outer periphery of the support wall portion 111 of the first case member 11. The protrusion 111c is provided in a region between the thick portions 118 and 119 in the rotation axis X direction. A radial thickness (protrusion height) of the protrusion 111c in the radial direction of the rotation axis X is the same as the radial thickness H2 of the thick portions 118 and 119.

The protrusion 111c is a wall that extends in the circumferential direction around the rotation axis X and surrounds the rotation axis X with a gap therebetween. The protrusion 111c is provided over the entire circumference of the support wall portion 111 along the circumferential direction around the rotation axis X. The protrusion 111c is provided with a phase shift in the circumferential direction around the rotation axis X, and is provided in a spiral shape whose position in the rotation axis X direction varies from the one end 111a toward the other end 111b of the support wall portion 111. When viewed in the radial direction, the protrusion 111c is provided along a straight line Lq inclined from a straight line Lp orthogonal to the rotation axis X. An angle θ formed by the straight line Lp and the straight line Lq is a lead angle forming a spiral.

As illustrated in FIG. 7, at the one end 111a of the support wall portion 111, the protrusion 111c is connected to the thick portion 118 via a connection wall 111d. At the other end 111b of the support wall portion 111, the protrusion 111c is connected to the thick portion 119 via a connection wall 111e. The connection walls 111d and 111e are each provided in a direction along the rotation axis X. A protrusion height (thickness) of the connection walls 111d and 111e in the radial direction of the rotation axis X is the same as the thickness H2 of the protrusion 111c and the thick portions 118 and 119.

As illustrated in FIG. 6 and FIG. 7, the peripheral wall portion 121 of the second case member 12 is fitted onto the support wall portion 111 of the first case member 11 (see broken lines in FIG. 6 and FIG. 7).

The peripheral wall portion 121 of the second case member 12 comes into contact with the thick portions 118 and 119 of the support wall portion 111 of the first case member 11, the protrusion 111c, and the connection walls 111d and 111e.

Accordingly, a spiral space, which continues from the one end 111a of the support wall portion 111 toward the other end 111b, is formed between the peripheral wall portion 121 and the support wall portion 111. The spiral space forms a cooling path CP1 through which cooling water W (see FIG. 5), which is a coolant, flows.

The cooling water W exchanges heat with the motor 2 and the oil OL accommodated inside the support wall portion 111 via the support wall portion 111. In FIG. 5, the spiral cooling path CP1 is simplified and illustrated as a straight line.

As illustrated in FIG. 7, in the cooling path CP1, a portion surrounded by the protrusion 111c, the thick portion 118, and the connection wall 111d at the one end 111a of the support wall portion 111 serves as an inlet CP1a for the cooling water W. Further, in the cooling path CP1, a portion surrounded by the protrusion 111c, the thick portion 119, and the connection wall 111e at the other end 111b of the support wall portion 111 serves as an outlet CP1b for the cooling water W. The inlet CP1a and the outlet CP1b for the cooling water W correspond to a start point and an end point of the spiral space, respectively.

As illustrated in FIG. 6, one end of a pipe P1 is connected to the inlet CP1a of the cooling path CP1. The other end of the pipe P1 is connected to a cooling path CP2 of the inverter case 17, which will be described later. One end of a pipe P2 is connected to the outlet CP1b of the cooling path CP1. The other end of the pipe P2 is connected to an oil cooler 83, which will be described later.

The pipes P1 and P2 are each provided to penetrate the peripheral wall portion 121 of the second case member 12.

As illustrated in FIG. 3, the cover member 13 includes a wall portion 130 orthogonal to the rotation axis X and a joint portion 132.

When viewed from the second case member 12, the cover member 13 is positioned on an opposite side (right side in the drawing) to the differential mechanism 5. The joint portion 132 of the cover member 13 is joined to the joint portion 122 of the second case member 12 from the rotation axis X direction. The cover member 13 and the second case member 12 are connected to each other by bolts (not illustrated). In this state, an opening of the second case member 12 closer to the joint portion 122 (right side in the drawing) is closed by the cover member 13.

In the cover member 13, an insertion hole 130a for the drive shaft 9A is provided in a central portion of the wall portion 130.

A lip seal RS is provided on an inner periphery of the insertion hole 130a. A lip portion (not illustrated) of the lip seal RS comes into elastic contact with an outer periphery of the drive shaft 9A. A gap between the inner periphery of the insertion hole 130a and the outer periphery of the drive shaft 9A is sealed by the lip seal RS.

A peripheral wall portion 131 surrounding the insertion hole 130a is provided on a surface of the wall portion 130 closer to the second case member 12 (left side in the drawing). The drive shaft 9A is supported on an inner periphery of the peripheral wall portion 131 via bearings B4.

A motor support portion 135 and a connection wall 136 are provided on an inner diameter side of the joint portion 132. The motor support portion 135 is provided closer to the motor 2 (left side in the drawing) when viewed from the peripheral wall portion 131. The motor support portion 135 has a tubular shape surrounding the rotation axis X with a gap therebetween.

The cylindrical connection wall 136 is connected to an outer periphery of the motor support portion 135. The connection wall 136 is formed with a larger outer diameter than the peripheral wall portion 131 closer to the wall portion 130 (right side in the drawing).

The connection wall 136 is provided in a direction along the rotation axis X and extends away from the motor 2. The connection wall 136 connects the motor support portion 135 and the joint portion 132.

One end 20a of the motor shaft 20 penetrates an inner side of the motor support portion 135 from the motor 2 to the peripheral wall portion 131.

A bearing B1 is supported on an inner periphery of the motor support portion 135. The outer periphery of the motor shaft 20 is supported by the motor support portion 135 via the bearing B1.

A lip seal RS is provided at a position adjacent to the bearing B1.

Oil holes 136a and 136b are opened in an inner periphery of the connection wall 136. Oil OL flows from the oil hole 136a into a space (internal space Sc) surrounded by the connection wall 136. The oil OL flowing into the internal space Sc is discharged from the oil hole 136b. The lip seal RS is provided to prevent the oil OL in the connection wall 136 from flowing into the motor 2.

As illustrated in FIG. 3, the gear case 14 includes a peripheral wall portion 141 and a flange-shaped joint portion 142 provided at an end portion of the peripheral wall portion 141 closer to the motor case 10. A support portion 145 for a bearing B2, which will be described later, is provided at an end portion of the peripheral wall portion 141 on a side (left side in the drawing) opposite to the joint portion 142. The peripheral wall portion 141 includes a tubular wall portion 141a connected to the joint portion 142 and an inclined portion 141b (inclined surface) connected to the support portion 145. The inclined portion 141b is inclined in a direction in which an inner diameter decreases from the tubular wall portion 141a toward the support portion 145. The planetary reduction gear 4 and the differential mechanism 5, which are the power transmission mechanism 3, are accommodated inside the peripheral wall portion 141.

As illustrated in FIG. 3, the gear case 14 is positioned closer to the differential mechanism 5 (left side in the drawing) when viewed from the motor case 10. The joint portion 142 of the gear case 14 is joined to the joint portion 112 of the first case member 11 of the motor case 10 from the rotation axis X direction. The gear case 14 and the first case member 11 are connected to each other by bolts (not illustrated). A mating surface T between the joint portion 142 of the gear case 14 and the joint portion 112 of the first case member 11 is orthogonal to the rotation axis X.

When viewed in the radial direction of the rotation axis X, the cooling path CP1 extends in a direction away from the mating surface T toward the motor 2 along the rotation axis X.

A space formed inside the joined motor case 10 and gear case 14 is divided into two spaces by the wall portion 110 (cover) of the first case member 11. Specifically, a space surrounded by the support wall portion 111, the wall portion 110, and the cover member 13 is a motor chamber Sa. The motor 2 is accommodated in the motor chamber Sa. A space surrounded by the support wall portion 111, the wall portion 110, and the gear case 14 is a gear chamber Sb. The power transmission mechanism 3 is accommodated in the gear chamber Sb. The wall portion 110 as a cover is sandwiched between the motor 2 and the differential mechanism 5 inside the housing HS.

As illustrated in FIG. 3, the gear chamber Sb includes a first gear chamber Sb1 closer to the first case member 11 and a second gear chamber Sb2 closer to the gear case 14 with the mating surface T as a boundary.

The cover referred to here may have a portion accommodated in the housing HS, or the entire cover may be accommodated in the housing HS like the wall portion 110. The cover may be, for example, separate from the first case member 11. In this case, the cover may be sandwiched and fixed between the motor case 10 and the gear case 14. A part of the cover may be exposed outside of the housing HS.

The motor 2 includes the cylindrical motor shaft 20, the cylindrical rotor core 21 fitted onto the motor shaft 20, and a stator core 25 surrounding an outer periphery of the rotor core 21 with a gap therebetween.

In the motor shaft 20, the bearings B1 and B1 are fitted and fixed to both sides of the rotor core 21.

The bearing B1 positioned on the one end 20a (right side in the drawing) of the motor shaft 20 when viewed from the rotor core 21 is supported on the inner periphery of the motor support portion 135 of the cover member 13. The bearing B1 positioned on the other end 20b (left side in the drawing) is supported on the inner periphery of the cylindrical motor support portion 115 of the first case member 11.

The motor support portions 135 and 115 are disposed on inner diameter sides of coil ends 253a and 253b, which will be described later. The motor support portions 135 and 115 are respectively disposed facing the one end portion 21a and the other end portion 21b of the rotor core 21 with a gap therebetween in the rotation axis X direction.

The rotor core 21 is formed by laminating a plurality of silicon steel plates. Each of the silicon steel plates is fitted onto the motor shaft 20 such that relative rotation with respect to the motor shaft 20 is restricted.

When viewed from the rotation axis X direction of the motor shaft 20, the silicon steel plate has a ring shape. On an outer peripheral side of the silicon steel plate, N-pole and S-pole magnets (not illustrated) are alternately provided in the circumferential direction around the rotation axis X.

The stator core 25 surrounding the outer periphery of the rotor core 21 is formed by laminating a plurality of electromagnetic steel plates. The stator core 25 is fixed to an inner periphery of the cylindrical support wall portion 111 of the first case member 11.

Each of the electromagnetic steel plates includes a ring-shaped yoke portion 251 fixed to the inner periphery of the support wall portion 111, and a teeth portion 252 protruding from an inner periphery of the yoke portion 251 toward the rotor core 21.

In the present embodiment, the stator core 25 in which a winding 253 is wound around a plurality of teeth portions 252 in a distributed manner is adopted. The stator core 25 is longer than the rotor core 21 in the rotation axis X direction by lengths of the coil ends 253a and 253b protruding in the rotation axis X direction.

A stator core in which windings are concentratedly wound around each of the plurality of teeth portions 252 protruding toward the rotor core 21 may be adopted.

The opening 110a is provided in the wall portion 110 (motor support portion 115) of the first case member 11. The other end 20b of the motor shaft 20 penetrates through the opening 110a to the differential mechanism 5 (left side in the drawing) and is positioned in the first gear chamber Sb1.

The other end 20b of the motor shaft 20 faces a side gear 54A, which will be described later, with a gap therebetween in the rotation axis X direction.

A lip seal RS is inserted between the motor shaft 20 and the opening 110a of the wall portion 110.

The oil OL for lubricating the planetary reduction gear 4 and the differential mechanism 5 is sealed in the gear chamber Sb.

The lip seal RS is provided to prevent the oil OL in the gear chamber Sb from flowing into the motor case 10.

As illustrated in FIG. 4, in the first gear chamber Sb1, the sun gear 41 of the planetary reduction gear 4 is spline-fitted closer to the other end 20b of the motor shaft 20.

A teeth portion 41a is formed on an outer periphery of the sun gear 41, and a large-diameter gear portion 431 of a stepped pinion gear 43 meshes with the teeth portion 41a.

The stepped pinion gear 43 includes the large-diameter gear portion 431 (large pinion) that meshes with the sun gear 41 and a small-diameter gear portion 432 (small pinion) that has a smaller diameter than the large-diameter gear portion 431.

The large-diameter gear portion 431 and the small-diameter gear portion 432 are integrated gear components disposed side by side in a direction of an axis X1 parallel to the rotation axis X.

An outer periphery of the small-diameter gear portion 432 meshes with an inner periphery of a ring gear 42. The ring gear 42 has a ring shape surrounding the rotation axis X with a gap therebetween. On the outer periphery of the ring gear 42, engagement teeth are provided, and the engagement teeth are spline-fitted to a teeth portion 146a provided on an inner periphery of the tubular wall portion 141a. The ring gear 42 is restricted from rotating around the rotation axis X.

A pinion shaft 44 penetrates inner diameter sides of the large-diameter gear portion 431 and the small-diameter gear portion 432.

The stepped pinion gear 43 is rotatably supported on an outer periphery of the pinion shaft 44 via needle bearings NB and NB.

As illustrated in FIG. 4, the stepped pinion gear 43 is provided across the first gear chamber Sb1 and the second gear chamber Sb2, with the mating surface T between the first case member 11 and the gear case 14 interposed therebetween.

The large-diameter gear portion 431 of the stepped pinion gear 43 is positioned in the first gear chamber Sb1.

The large-diameter gear portion 431 meshes with the sun gear 41 on a radially inner side of the rotation axis X. The large-diameter gear portion 431 faces an inner peripheral surface 111s (see FIG. 3) of the support wall portion 111 with a gap therebetween on a radially outer side of the rotation axis X, and overlaps the cooling path CP1.

The small-diameter gear portion 432 of the stepped pinion gear 43 is positioned in the second gear chamber Sb2.

The small-diameter gear portion 432 meshes with the ring gear 42 on the radially outer side of the rotation axis X.

As illustrated in FIG. 3, the differential mechanism 5 includes the differential case 50 (differential case) as an input element, a drive shaft (output shaft) as an output element, and a differential gear set as a differential element. Although detailed description is omitted, the differential case 50 may be configured by two case members assembled in the rotation axis X direction.

The differential case 50 also functions as a carrier that supports the stepped pinion gear 43 of the planetary reduction gear 4. As illustrated in FIG. 4, the stepped pinion gear 43 is rotatably supported by the differential case 50 via the pinion shaft 44. As illustrated in FIG. 8, in the differential case 50 according to the present embodiment, a total of three stepped pinion gears 43 are disposed at intervals in the circumferential direction around the rotation axis X.

As illustrated in FIG. 3, in the differential case 50, as the differential gear set, a pinion mate gear 52, which is a bevel gear type differential gear, and side gears 54A and 54B are provided. The pinion mate gear 52 is supported by a pinion mate shaft 51.

The pinion mate shaft 51 includes a central member 510 disposed on the rotation axis X and shaft members 511 connected to an outer diameter side of the central member 510. Although not illustrated, a plurality of shaft members 511 are provided at equal intervals in the circumferential direction around the rotation axis X. The shaft member 511 is inserted through a support hole 69 of the differential case 50 extending in the radial direction and supported.

The pinion mate gear 52 is fitted onto each of the shaft members 511 one by one and is rotatably supported.

In the differential case 50, the side gear 54A is positioned on one side of the central member 510 in the rotation axis X direction, and the side gear 54B is positioned on the other side of the central member 510. The side gears 54A and 54B are each rotatably supported by the differential case 50.

The side gear 54A meshes with the pinion mate gear 52 from one side in the rotation axis X direction. The side gear 54B meshes with the pinion mate gear 52 from the other side in the rotation axis X direction.

An opening 60 and the tubular wall portion 61 surrounding the opening 60 are provided in a central portion on one end side (right side in the drawing) of the differential case 50. The tubular wall portion 61 extends toward the motor case 10. An outer periphery of the tubular wall portion 61 is supported by the wall portion 110 of the first case member 11 via the bearing B2.

The drive shaft 9A inserted through the opening 60 is inserted into the differential case 50 from the rotation axis X direction. The drive shaft 9A penetrates the insertion hole 130a of the wall portion 130 of the cover member 13, and is provided across inner diameter sides of the motor shaft 20 of the motor 2 and the sun gear 41 of the planetary reduction gear 4 in the rotation axis X direction.

As illustrated in FIG. 3, a through hole 65 and a tubular wall portion 66 surrounding the through hole 65 are formed in a central portion on the other end side (left side in the drawing) of the differential case 50. A bearing B2 is fitted onto the tubular wall portion 66. The bearing B2 fitted onto the tubular wall portion 66 is held by the support portion 145 of the gear case 14. The tubular wall portion 66 of the differential case 50 is rotatably supported by the gear case 14 via the bearing B2.

The drive shaft 9B penetrating an opening 145a of the gear case 14 is inserted into the support portion 145 from the rotation axis X direction. The drive shaft 9B is rotatably supported by the support portion 145. The tubular wall portion 66 functions as a shaft support portion that supports an outer periphery of the drive shaft 9B.

A lip seal RS is fixed to an inner periphery of the opening 145a. A lip portion (not illustrated) of the lip seal RS comes into elastic contact with an outer periphery of a tubular wall portion 540 of the side gear 54B fitted onto the drive shaft 9B.

Accordingly, a gap between the outer periphery of the tubular wall portion 540 of the side gear 54B and the inner periphery of the opening 145a is sealed.

Inside the differential case 50, distal end portions of the drive shafts 9 (9A and 9B) face each other with a gap therebetween in the rotation axis X direction.

The side gears 54A and 54B supported by the differential case 50 are spline-fitted to outer peripheries of distal end portions of the drive shafts 9 (9A and 9B). The side gears 54A and 54B and the drive shafts 9 (9A and 9B) are coupled to each other so as to be integrally rotatable around the rotation axis X.

In this state, the side gears 54A and 54B are disposed facing each other with a gap therebetween in the rotation axis X direction. The central member 510 of the pinion mate shaft 51 is positioned between the side gears 54A and 54B.

The pinion mate gear 52 of the pinion mate shaft 51 is assembled to the side gear 54A positioned on one side in the rotation axis X direction and the side gear 54B positioned on the other side in a state in which teeth portions thereof are meshed with each other.

As illustrated in FIG. 4, a support hole 62 at one end 44a of the pinion shaft 44 is formed an outer diameter side of the opening 60 at the one end (right side in the drawing) of the differential case 50. A support hole 68 at the other end 44b of the pinion shaft 44 is formed at the other end (left side in the drawing) of the differential case 50.

The support holes 62 and 68 are formed at overlapping positions in the rotation axis X direction. The support holes 62 and 68 are formed at intervals in the circumferential direction around the rotation axis X according to the position where the stepped pinion gear 43 is disposed. The one end 44a of the pinion shaft 44 is inserted into the support hole 62, and the other end 44b is inserted into the support hole 68. The other end 44b of the pinion shaft 44 is press-fitted into the support hole 68, so that the pinion shaft 44 is fixed to the differential case 50 so as not to be rotatable relative to the differential case 50. The stepped pinion gear 43 fitted onto the pinion shaft 44 is rotatably supported around the axis X1 parallel to the rotation axis X.

As illustrated in FIG. 3, the oil OL for lubrication is stored inside the gear case 14. When the differential case 50 rotates around the rotation axis X, the oil OL is scraped up by the differential case 50.

Although detailed description is omitted, an oil passage, an oil hole, and the like for introducing the oil OL scraped up by the differential case 50 are provided in the differential case 50, the pinion shaft 44, and the like. Accordingly, the oil OL is easily introduced into rotating members such as the bearing B2 and the needle bearing NB.

Here, as illustrated in FIG. 8, when the vehicle equipped with the unit 1 travels forward, the differential case 50 rotates in a clockwise direction CW around the rotation axis X when viewed from the gear case 14. As illustrated in FIG. 4, the small-diameter gear portion 432 of the stepped pinion gear 43 meshes with the ring gear 42 fixed to an inner periphery of the gear case 14. Therefore, as illustrated in FIG. 8, the large-diameter gear portion 431 of the stepped pinion gear 43 revolves in the clockwise direction CW around the rotation axis X while rotating in a counterclockwise direction around the axis X1.

As illustrated in FIG. 8, the catch tank 15 is provided above the first gear chamber Sb1 in the first case member 11. The catch tank 15 is positioned on one side (right side in the drawing) of the vertical line VL orthogonal to the rotation axis X.

As illustrated in FIG. 8, the first case member 11 includes a bulging portion 151 formed by bulging a part of the support wall portion 111 radially outward. The catch tank 15 is a space formed inside the bulging portion 151. The bulging portion 151 includes a first wall portion 151a provided in a direction along a horizontal line HL passing through the rotation axis X, and a second wall portion 151b provided in a direction along the vertical line VL.

The first wall portion 151a of the bulging portion 151 constitutes a bottom wall of the catch tank 15. The second wall portion 151b of the bulging portion 151 constitutes a side wall of the catch tank 15.

The catch tank 15 and the first gear chamber Sb1 are partitioned by a partition wall 152.

The partition wall 152 is a wall branched from the support wall portion 111 on a lower side of the bulging portion 151.

The partition wall 152 is provided in a direction along a virtual circle Im' (see FIG. 9) having a larger diameter than a virtual circle Im (see FIG. 8) which is a revolution trajectory drawn by an outermost periphery of the large-diameter gear portion 431. The partition wall 152 is inclined in a direction approaching the horizontal line HL as the partition wall 152 is away from the vertical line VL in the horizontal line direction (right direction in FIG. 8).

As illustrated in FIG. 8, the catch tank 15 communicates with the first gear chamber Sb1 via a communication port 152a provided in the partition wall 152. The communication port 152a opens toward an upstream side in the revolution direction of the large-diameter gear portion 431.

As illustrated in FIG. 4, the partition wall 152 extends from a surface of the wall portion 110 closer to the first gear chamber Sb1 toward the gear case 14 in the rotation axis X direction.

As illustrated in FIG. 9, a through hole 155 is provided in the second wall portion 151b of the bulging portion 151. The through hole 155 is provided in a vicinity of the partition wall 152 in the vertical line VL direction. A boss portion 156 surrounding the through hole 155 is provided in the second wall portion 151b. One end of the pipe P3 is fitted into the through hole 155 from the radial direction of the rotation axis X. A seal ring (not illustrated) is interposed between the pipe P3 and the through hole 155.

As illustrated in FIG. 10, the pipe P3 penetrates the cooling path CP1 in the radial direction of the rotation axis X, and extends to the cover member 13 (see FIG. 2) through an outside of the second case member 12. The other end of the pipe P3 communicates with the oil hole 136a (see FIG. 3) provided in the cover member 13.

Here, as illustrated in FIG. 6 and FIG. 7, the bulging portion 151 constituting the catch tank 15 is provided closer to the other end 111b of the support wall portion 111 of the first case member 11.

In a region of the support wall portion 111 in which the bulging portion 151 is provided, the protrusion 111c protrudes from the outer periphery of the support wall portion 111 along an outer shape of the bulging portion 151.

Further, as indicated by broken lines in FIG. 6 and FIG. 7, the second case member 12 includes a bulging portion 125 bulging radially outward. The bulging portion 125 is provided on the other end 121b of the peripheral wall portion 121. The bulging portion 125 has a shape conforming to the outer shape of the bulging portion 151 of the first case member 11.

Specifically, as illustrated in FIG. 8, the bulging portion 125 includes a first wall portion 125a provided in a direction along the horizontal line HL and a second wall portion 125b provided in a direction along the vertical line VL.

As illustrated in FIG. 9, the bulging portion 125 includes a through hole 126 through which the pipe P3 passes and a boss portion 127 surrounding the through hole 126. A seal ring (not illustrated) is interposed between the pipe P3 and the through hole 126.

In the present embodiment, when the peripheral wall portion 121 of the second case member 12 is inserted onto the support wall portion 111 of the first case member 11 to form the motor case 10, the bulging portion 125 of the second case member 12 overlaps the bulging portion 151 of the first case member 11.

Accordingly, the spiral cooling path CP1 formed in the motor case 10 is formed in a range in the rotation axis X direction across the motor chamber Sa, the first gear chamber Sb1, and the catch tank 15 (see FIG. 6).

As illustrated in FIG. 9, in a region of the motor case 10 in which the catch tank 15 is provided, the cooling path CP1 has a portion adjacent to the first wall portion 151a (bottom wall) of the bulging portion 151 constituting the catch tank 15. Further, the cooling path CP1 has a portion adjacent to the second wall portion 151b (side wall) of the bulging portion 151 constituting the catch tank 15.

As illustrated in FIG. 5, the unit 1 is provided with a circulation system 80 for the cooling water W.

The circulation system 80 circulates the cooling water W between the cooling path CP1 in the motor case 10 and the cooling path CP2 in the inverter case 17. The circulation system 80 further includes the oil cooler 83, a water pump WP, and a radiator 82, which are connected by pipes or the like through which the cooling water W flows.

The water pump WP pumps the cooling water W in the circulation system 80.

The radiator 82 is a device that dissipates heat of the cooling water W to cool the cooling water W.

The oil cooler 83 is a heat exchanger that exchanges heat between the cooling water W and the oil OL.

The cooling water W pumped to the water pump WP flows through the cooling path CP2 in the inverter case 17, and is then supplied to the oil cooler 83 through the cooling path CP1 in the motor case 10. The oil cooler 83 cools the oil OL by exchanging heat between the cooling water W and the oil OL. The cooling water W flowing through the oil cooler 83 is cooled by the radiator 82 and then supplied to the cooling path CP2 in the inverter case 17 again.

Here, as illustrated in FIG. 6, the cooling path CP1 is connected to the pipe P1 at the inlet CP1a. The pipe P1 is also connected to the cooling path CP2 in the inverter case 17. The cooling path CP1 is connected to the pipe P2 that penetrates the second case member 12 at the outlet CP1b. The pipe P2 is also connected to the oil cooler 83.

The cooling water W discharged from the cooling path CP2 in the inverter case 17 is supplied to the inlet CP1a of the cooling path CP1 through the pipe P1. In the cooling path CP2, the cooling water W moves spirally in the motor case 10 from the inlet CP1a toward the outlet CP1b.

The cooling water W cools the motor 2, cools the oil OL in the first gear chamber Sb1, and cools the oil OL in the catch tank 15 in a process of spirally moving in the motor case 10.

The cooling water W that has reached the outlet CP1b of the cooling path CP1 is discharged from the pipe P2 to the oil cooler 83.

Functions of the unit 1 having such a configuration will be described.

As illustrated in FIG. 1, in the unit 1, the planetary reduction gear 4, the differential mechanism 5, and the drive shafts 9A and 9B are provided along the transmission path of the output rotation of the motor 2.

As illustrated in FIG. 3, when the motor 2 is driven and the rotor core 21 rotates around the rotation axis X, the motor shaft 20 rotates integrally with the rotor core 21. Rotation of the motor shaft 20 is input to the sun gear 41 of the planetary reduction gear 4.

In the planetary reduction gear 4, the sun gear 41 serves as an input portion for the output rotation of the motor 2, and the differential case 50 supporting the stepped pinion gear 43 serves as an output portion for the input rotation.

As illustrated in FIG. 4, when the sun gear 41 rotates around the rotation axis X by the input rotation, the stepped pinion gear 43 (large-diameter gear portion 431 and small-diameter gear portion 432) rotates around the axis X1 by the rotation input from the sun gear 41.

Here, the small-diameter gear portion 432 of the stepped pinion gear 43 meshes with the ring gear 42 fixed to the inner periphery of the gear case 14. Therefore, the stepped pinion gear 43 revolves around the rotation axis X while rotating around the axis X1.

Here, in the stepped pinion gear 43, an outer diameter of the small-diameter gear portion 432 is smaller than an outer diameter of the large-diameter gear portion 431.

Accordingly, the differential case 50 supporting the stepped pinion gear 43 rotates around the rotation axis X at a rotation speed lower than that of the rotation input from the motor 2.

Therefore, the rotation input to the sun gear 41 of the planetary reduction gear 4 is greatly decelerated by the stepped pinion gear 43 and then output to the differential case 50 (differential mechanism 5).

As illustrated in FIG. 3, when the differential case 50 rotates around the rotation axis X due to the input rotation, the drive shafts 9A and 9B meshing with the pinion mate gear 52 rotate around the rotation axis X in the differential case 50. Accordingly, the left and right drive wheels K and K (see FIG. 1) of the vehicle equipped with the unit 1 are rotated by the transmitted rotational driving force.

The oil OL for lubrication is stored inside the gear chamber Sb. When the output rotation of the motor 2 is transmitted, the oil OL in the gear chamber Sb is scraped up by the differential case 50 rotating around the rotation axis X.

As illustrated in FIG. 3 and FIG. 4, the scraped-up oil OL lubricates a meshing portion between the sun gear 41 and the large-diameter gear portion 431, a meshing portion between the small-diameter gear portion 432 and the ring gear 42, and meshing portions between the pinion mate gear 52 and the side gears 54A and 54B.

As illustrated in FIG. 8, as the differential case 50 rotates, the large-diameter gear portion 431 rotates (revolves) in the first gear chamber Sb1 in the clockwise direction CW around the rotation axis X. When the large-diameter gear portion 431 revolves in the clockwise direction CW around the rotation axis X, the oil OL in the first gear chamber Sb1 also flows in the clockwise direction CW around the rotation axis X.

Specifically, the oil OL stored on a lower side in the vertical line VL direction among the oil OL in the first gear chamber Sb1 moves on the inner peripheral surface 111s of the support wall portion 111 in the clockwise direction CW around the rotation axis X (white arrow a in FIG. 8). The oil OL scraped up to an upper side in the vertical line VL direction among the oil OL in the first gear chamber Sb1 is scattered outward in the radial direction of the rotation axis X while moving in the clockwise direction CW (white arrow b in FIG. 8) around the rotation axis X.

The catch tank 15 is provided above the first gear chamber Sb1. The catch portion 15 is positioned on a downstream side in a revolution direction of the large-diameter gear portion 431. A part of the oil OL scraped up by revolution of the large-diameter gear portion 431 and scattered flows into the catch tank 15 from the communication port 152a.

The catch tank 15 is positioned on a right side of the vertical line VL, that is, on the downstream side in the revolution direction of the large-diameter gear portion 431. Accordingly, most of the oil OL scraped up by the large-diameter gear portion 431 revolving around the rotation axis X can flow into the catch tank 15 (see FIG. 8). FIG. 8 illustrates a case in which the large-diameter gear portion 431 rotates in the counterclockwise direction around the axis X1 and revolves in the clockwise direction CW around the rotation axis X, the rotation direction and the revolution direction of the large-diameter gear portion 431 may be opposite to the rotation direction illustrated in FIG. 8. That is, the large-diameter gear portion 431 may rotate in the clockwise around the axis X1 and revolve in the counterclockwise direction around the rotation axis X. In this case, the oil OL is introduced into the catch tank 15 by utilizing revolution of the large-diameter gear portion 431 in the clockwise direction around the axis X1.

Here, as illustrated in FIG. 9, the partition wall 152 is positioned radially outward of the virtual circle Im through which the outermost periphery of the large-diameter gear portion 431 rotating around the rotation axis X passes. The partition wall 152 has an arc shape along the virtual circle Im'. The partition wall 152 is inclined in a direction (direction approaching the horizontal line HL) in which height thereof in the vertical line VL direction decreases as the partition wall 152 is away from the vertical line VL toward the outside in the horizontal line HL direction. Accordingly, the oil OL flowing into the catch tank 15 moves downward in the vertical line VL direction along inclination of the partition wall 152. Therefore, the oil OL flowing into the catch tank 15 is accumulated in a region of the catch tank 15 surrounded by the partition wall 152 and the second wall portion 151b.

The oil OL accumulated in the region surrounded by the partition wall 152 and the second wall portion 151b passes through the second wall portion 151b and flows into the pipe P3 that opens into the catch tank 15. The oil OL flowing into the pipe P3 is discharged to the internal space Sc from the oil hole 136a (see FIG. 2) on the cover member 13 to which the other end of the pipe P3 is connected (see FIG. 3). The oil OL supplied to the internal space Sc lubricates the bearing B4 and is then discharged from the oil hole 136b. The oil OL discharged from the oil hole 136b is supplied again into the gear chamber Sb from an oil hole Ha through a pipe (not illustrated).

Here, in the power transmission mechanism 3, the large-diameter gear portion 431 has a largest rotation radius (revolution radius). The oil OL in the first gear chamber Sb1 is scraped up by the large-diameter gear portion 431, thereby largely moving (scattering) in the circumferential direction. The scraped-up oil OL is introduced into the catch tank 15, so that an oil level in the first gear chamber Sb1 decreases. Accordingly, stirring resistance of the oil OL during the revolution of the large-diameter gear portion 431 can be reduced.

In the present embodiment, the large-diameter gear portion 431, the inner peripheral surface 111s of the support wall portion 111, and the cooling path CP1 overlap each other in the radial direction (see FIG. 3). Therefore, the oil OL moving along the inner peripheral surface 111s and the cooling water W flowing through the cooling path CP1 can exchange heat via a region of the support wall portion 111.

When the large-diameter gear portion 431 revolves around the rotation axis X during traveling of the vehicle on which the unit 1 is mounted, the oil OL stored on the lower side in the vertical line VL direction among the oil OL in the first gear chamber Sb1 largely moves in the clockwise direction CW around the rotation axis X along the inner peripheral surface 111s of the support wall portion 111. In this process, the oil OL is cooled by heat exchange with the cooling water W in the cooling path CP1.

A part of the scraped-up oil OL among the oil OL in the first gear chamber Sb1 collides with the first wall portion 151a of the bulging portion 151, and is then introduced into the catch tank 15.

The cooling path CP1 has a portion adjacent to the first wall portion 151a (bottom wall) of the bulging portion 151 constituting the catch tank 15. The oil OL flowing along an inner periphery of the first wall portion 151a among the scraped-up oil OL is cooled by heat exchange with the cooling water flowing through the cooling path CP1 via a region of the first wall portion 151a in the bulging portion 151 (see FIG. 9). Therefore, a temperature of the oil OL flowing into the catch tank 15 can be lowered in advance.

Further, the cooling path CP1 has a portion adjacent to the second wall portion 151b (side wall) of the bulging portion 151 constituting the catch tank 15. Accordingly, the oil OL stored in the catch tank 15 is also cooled by heat exchange with the cooling water W flowing through the cooling path CP1 via a region of the second wall portion 151b of the bulging portion 151.

Therefore, the oil OL supplied from the catch tank 15 to the internal space Sc closer to the cover member 13 through the pipe P3 can be efficiently cooled.

As described above, the cooling path CP1 according to the present embodiment is provided in a range extending over the motor chamber Sa, the first gear chamber Sb1, and the catch tank 15. Therefore, a total length of the cooling path is longer than that in a case in which the cooling path is provided only around the motor chamber Sa, and a contact area between the cooling water W and the motor case 10 (housing HS) is larger. Accordingly, heat exchange efficiency in the unit 1 is improved.

Hereinafter, examples of the unit 1 according to an aspect of the present invention will be listed.
(1) The unit 1 includes
the housing HS that accommodates the motor 2 and the planetary gear mechanism 4.
The housing HS includes the cooling path CP1 (flow path) through which cooling water W (coolant) for cooling the motor 2 flows.

The planetary gear mechanism 4 includes the stepped pinion gear 43 (stepped pinion gear).

The stepped pinion gear 43 includes the small-diameter gear portion 432 (small pinion) and the large-diameter gear portion 431 (large pinion).

The motor 2 and the planetary gear mechanism 4 are arranged in the direction of the rotation axis X.

When viewed in the radial direction of the rotation axis X (when viewed in the radial direction), the cooling path CP1 extends in the rotation axis X direction.

The cooling path CP1 has a portion that overlaps the large-diameter gear portion 431 in the radial direction of the rotation axis X.

With this configuration, the contact area between the housing HS and the cooling water W is increased. Accordingly, the heat exchange efficiency in the unit 1 is improved.

Specifically, the cooling path CP1 that cools the motor 2 extends to a side of the first gear chamber Sb1 that accommodates the large-diameter gear portion 431, so that the total length of the cooling path CP1 can be made longer than that in a case in which only the motor 2 is cooled. Since the total length of the cooling path CP1 can be increased, the contact area between the cooling water W and the housing HS is increased, thereby improving the heat exchange efficiency in the unit 1.

Further, the cooling path CP1 can also cool the motor 2 and the oil OL. Accordingly, in order to cool the oil OL, it is not necessary to provide a cooling path different from the cooling path of the motor 2 and connect the cooling path with a pipe or the like.

In the planetary gear mechanism 4, the large-diameter gear portion 431 has a largest rotation radius. The oil OL in the housing HS is scraped up by the large-diameter gear portion 431, thereby largely moving (scattering) in the circumferential direction.

Therefore, with the configuration described above, a part of the cooling path CP1 in the housing HS overlaps the large-diameter gear portion 431 in the radial direction, so that a distance in which heat exchange with the cooling water W with the oil OL largely moving in the circumferential direction is performed can be increased.

(2) The housing HS includes the motor case 10 (flow path-equipped case) including the cooling path CP1, and the gear case 14 (facing case) that faces the motor case 10.

When viewed in the radial direction of the rotation axis X, the cooling path CP1 extends in a direction away from the mating surface T of the motor case 10 and the gear case 14 in the rotation axis X direction.

The mating surface T is provided at a position offset from the large-diameter gear portion 431 in the rotation axis X direction.

With this configuration, the contact area between the housing HS and the cooling water W is increased. Accordingly, the heat exchange efficiency in the unit 1 is improved.

Specifically, by extending the motor case 10 including the cooling path CP1 to a position overlapping the large-diameter gear portion 431 in the radial direction, the total length of the cooling path CP1 extending in the direction away from the mating surface T in the rotation axis X direction can be increased. Accordingly, the contact area between the cooling water W passing through the cooling path CP1 and the housing HS is increased, thereby improving the heat exchange efficiency in the unit 1.

Further, by offsetting the mating surface T from the large-diameter gear portion 431 in the rotation axis X direction, leakage of the oil OL scraped up by the large-diameter gear portion 431 from a vicinity of the mating surface T can be reduced.

(3) The differential case 50 serving as the carrier of the planetary gear mechanism 4 constitutes an input element of the differential gear mechanism 5.

The differential case 50 is connected to the stepped pinion gear 43 of the planetary gear mechanism 4 so as to be rotatable integrally therewith.

The differential gear mechanism 5 is accommodated in the gear case 14.

When viewed in the radial direction of the rotation axis X, the small-diameter gear portion 432 of the stepped pinion gear 43 meshes with the ring gear 42 fixed to the gear case 14.

For example, when the cooling path CP1 is extended to an outer diameter side of the small-diameter gear portion 431, the mating surface T is a boundary portion (see FIG. 3) between the tubular wall portion 141a and the inclined portion 141b of the peripheral wall portion 141. This makes it difficult to set the planetary gear mechanism 4 and the differential gear mechanism 5 in the gear chamber Sb during assembly.

Therefore, with the configuration described above, by setting a position of the mating surface T to a position between the large-diameter gear portion 431 and the small-diameter gear portion 432, the small-diameter gear portion 432, the differential case 50, and the differential gear mechanism 5 can be collectively set in the gear case 14. This is advantageous in that the heat exchange efficiency in the unit 1 is improved and assemblability of the components of the unit 1 is not impaired.

(4) When viewed in the radial direction of the rotation axis X, the cooling path CP1 has a portion that overlaps the motor 2.

With this configuration, the total length of the cooling path CP1 is increased by providing the cooling path CP1 in a range overlapping the large-diameter gear portion 431 and the motor 2 in the radial direction of the rotation axis X. Accordingly, the contact area between the housing HS and the cooling water W is increased, thereby improving the heat exchange efficiency in the unit 1.

(5, 6) The catch tank 15 is provided in the housing HS.

The catch tank 15 has a portion sandwiched between the cooling path CP1 and the virtual circle Im which is a revolution orbit of the large-diameter gear portion 431.

With this configuration, the oil OL scattered with the revolution of the large-diameter gear portion 431 is introduced into the catch tank 15, so that the oil level in the housing OL decreases. Accordingly, the stirring resistance of the oil OL during the revolution of the large-diameter gear portion 431 can be reduced.

Further, since the oil OL introduced into the catch tank 15 can also be cooled by the cooling path CP1, the heat exchange efficiency in the unit 1 is improved.

As illustrated in FIG. 6 and FIG. 7, in the present embodiment, an aspect in which the inlet CP1a and the outlet CP1b of the cooling path CP1 are provided above the rotation axis X (horizontal line HL) of the motor 2 in the vertical line VL direction in a state in which the unit 1 is mounted on the vehicle has been described, and the present invention is not limited to this aspect. For example, the inlet CP1a may be provided above the rotation axis X (horizontal line HL) of the motor 2 in the vertical line VL direction, and the outlet CP1b may be provided below the rotation axis X (horizontal line HL) of the motor 2 in the vertical line VL direction. Accordingly, the cooling water W can smoothly flow using gravity.

In an aspect of the present invention, the housing HS that accommodates at least the power transmission mechanism 3 has been described. According to another aspect of the present invention, the housing HS may be a housing that accommodates at least a motor. In this case, the power transmission mechanism may or may not be accommodated in the same housing.

Further, in another aspect of the present invention, the housing HS may be a housing that accommodates at least an inverter. In this case, the power transmission mechanism may or may not be accommodated in the same housing.

Further, in another aspect of the present invention, the housing HS may be a housing that accommodates at least a battery. In this case, the power transmission mechanism may or may not be accommodated in the same housing.

The power transmission mechanism 3 includes, for example, a gear mechanism and an annular mechanism.

The gear mechanism includes, for example, a reduction gear mechanism, an acceleration gear mechanism, and a differential gear mechanism (differential mechanism).

The reduction gear mechanism and the acceleration gear mechanism include, for example, a planetary gear mechanism and a parallel gear mechanism.

The annular mechanism includes, for example, an endless annular component.

The endless annular component includes, for example, a chain sprocket, and a belt and pulley.

The differential mechanism is, for example, a bevel gear type differential gear or a planetary gear type differential gear.

The differential mechanism includes a differential case as an input element, two output shafts as output elements, and a differential gear set as a differential element.

In the bevel gear type differential gear, the differential gear set includes bevel gears.

In the planetary gear type differential gear, the differential gear set includes planetary gears.

The unit 1 may include a gear that rotates integrally with the differential case.

For example, a final gear (differential ring gear) of the parallel gear mechanism rotates integrally with the differential case. For example, when a carrier of the planetary gear mechanism is connected to the differential case, a pinion gear rotates (revolves) integrally with the differential case.

For example, a reduction gear mechanism is connected downstream of the motor 2. A differential gear mechanism is connected downstream of the reduction gear mechanism. That is, a differential gear mechanism is connected downstream of the motor 2 via a reduction gear mechanism. An acceleration gear mechanism may be used instead of the reduction gear mechanism.

A single-pinion type planetary gear mechanism can use, for example, a sun gear as an input element, a ring gear as a fixed element, and a carrier as an output element.

A double-pinion type planetary gear mechanism can include, for example, a sun gear as an input element, a ring gear as an output element, and a carrier as a fixed element.

As a pinion gear of the single-pinion type planetary gear mechanism or the double-pinion type planetary gear mechanism, for example, a stepped pinion gear or a non-stepped pinion gear can be used.

The stepped pinion gear includes a large pinion and a small pinion. For example, it is preferable to mesh the large pinion with the sun gear. For example, it is preferable to fit the small pinion into the ring gear.

The non-stepped pinion gear is not a stepped pinion gear.

In the present embodiment, the unit mounted on the vehicle has been described as an example, and the present invention is not limited to this aspect. The unit can be applied to other than the vehicle.

While an embodiment of the invention has been described, the embodiment is merely one of application examples of the invention, and does not intend to limit a technical scope of the invention to a specific configuration according to the embodiment. Within the scope of the technical concept of the invention, modifications can be made as appropriate.

The present application claims a priority of Japanese Patent Application No. 2021-105243 filed with the Japan Patent Office on Jun. 24, 2021, all the contents of which are hereby incorporated by reference.

DESCRIPTION OF REFERENCE SIGNS 1 unit
2 motor
10 motor case (flow path-equipped case)
14 gear case (facing case)
15 catch tank
4 planetary gear mechanism
42 ring gear
43 stepped pinion gear
431 large-diameter gear portion (large pinion)
432 small-diameter gear portion (small pinion)
5 differential mechanism (differential gear mechanism)
50 differential case (carrier)
CP1 cooling path (flow path)
HS housing
T mating surface
W cooling water (coolant)
X rotation axis

The invention claimed is:

1. A unit comprising:
a housing configured to accommodate a planetary gear mechanism and an oil, wherein
the housing includes a flow path through which a coolant flows, the coolant is made of a first material different from a second material of the oil,
the planetary gear mechanism includes a stepped pinion gear,
the stepped pinion gear includes a small pinion and a large pinion,
the flow path has a portion that overlaps the large pinion when viewed in a radial direction,
the housing includes a flow path-equipped case including the flow path and a facing case that faces the flow path-equipped case,
the flow path extends in a direction away from a mating surface of the flow path-equipped case and the facing case when viewed in the radial direction,
a carrier of the planetary gear mechanism is connected to an input element of a differential gear mechanism so as to be rotatable integrally therewith,
the differential gear mechanism is accommodated in the facing case, and
the small pinion meshes with a ring gear fixed to the facing case, when viewed in the radial direction.

2. The unit according to claim 1, wherein
the flow path has a portion that overlaps with a motor when viewed in the radial direction.

3. A unit comprising:
a housing configured to accommodate a planetary gear mechanism and an oil, wherein
the housing includes a flow path through which a coolant flows, the coolant is made of a first material different from a second material of the oil,
the planetary gear mechanism includes a stepped pinion gear,
the stepped pinion gear includes a small pinion and a large pinion,
the flow path has a portion that overlaps the large pinion when viewed in a radial direction,
the unit further comprises a catch tank in the housing,
the catch tank has a portion sandwiched between the flow path and a revolution orbit of the large pinion,
the planetary gear mechanism is accommodated in a gear chamber in the housing, and
the catch tank is located above an oil level in the gear chamber.

4. The unit according to claim 2, further comprising:
a catch tank in the housing, wherein
the catch tank has a portion sandwiched between the flow path and a revolution orbit of the large pinion.

5. The unit according to claim 1, wherein
the flow path has a portion through which the coolant flows from above to below.

* * * * *